US006987627B1

(12) United States Patent
Gauzner et al.

(10) Patent No.: US 6,987,627 B1
(45) Date of Patent: Jan. 17, 2006

(54) DEVICE AND METHOD FOR CONTACT PATTERNING OF DUAL-SIDED MAGNETIC MEDIA

(75) Inventors: Gennady Gauzner, Livermore, CA (US); David Shiao-Min Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 57 days.

(21) Appl. No.: 10/417,220

(22) Filed: Apr. 17, 2003

Related U.S. Application Data

(60) Provisional application No. 60/402,244, filed on Aug. 8, 2002.

(51) Int. Cl.
G11B 5/86 (2006.01)
(52) U.S. Cl. .............................. 360/17; 360/15; 360/16
(58) Field of Classification Search ................. 360/17, 360/15, 16
See application file for complete search history.

(56) References Cited

U.S. PATENT DOCUMENTS

| 2,867,692 | A |   | 1/1959  | Camras  |        |
|-----------|---|---|---------|---------|--------|
| 4,422,106 | A |   | 12/1983 | Sawazaki|        |
| 4,644,416 | A |   | 2/1987  | Yamada  |        |
| 5,075,801 | A | * | 12/1991 | Chi et al. | 360/17 |
| 5,121,258 | A | * | 6/1992  | Chi et al. | 360/17 |
| 5,991,104 | A |   | 11/1999 | Bonyhard |        |
| 6,747,822 | B2| * | 6/2004  | Saito   | 360/17 |
| 6,906,875 | B2| * | 6/2005  | Kamatani et al. | 360/17 |
| 2003/0133211 | A1 |  | 7/2003 | Wang et al. |    |

FOREIGN PATENT DOCUMENTS

| EP | 63175229 | 7/1988 |
| EP | 63183623 | 7/1988 |
| EP | 05081671 | 4/1993 |
| EP | 1229521 A2 | 8/2002 |

OTHER PUBLICATIONS

U.S. Appl. No. 10/262,300, filed Sep. 30, 2002, Wang et al.

* cited by examiner

Primary Examiner—David Hudspeth
Assistant Examiner—Natalia Figueroa
(74) Attorney, Agent, or Firm—McDermott Will & Emery LLP

(57) ABSTRACT

A device for use in performing simultaneous contact printing of magnetic patterns in opposing surfaces of a dual-sided magnetic or magneto-optical (MO) recording medium, comprising:
(a) a fixedly mounted first magnetic pole having a first end surface;
(b) an axially movable second magnetic pole in axial alignment with the first magnetic pole, the second magnetic pole having a second end surface opposite to and facing the first end surface of the first magnetic pole;
(c) a first portion of a centering insert fixture mounted on the first end surface of the first magnetic pole; and
(d) a second portion of a centering insert fixture mounted on the second end surface of the second magnetic pole.

23 Claims, 3 Drawing Sheets

Patterned Medium

DEVICE AND METHOD FOR CONTACT PATTERNING OF DUAL-SIDED MAGNETIC MEDIA

CROSS-REFERENCE TO PROVISIONAL APPLICATION

This application claims priority from U.S. provisional patent application Ser. No. 60/402,244 filed Aug. 8, 2002, the entire disclosure of which is incorporated herein by reference.

FIELD OF THE INVENTION

The present invention relates to methods for forming magnetic transition patterns in dual-sided magnetic media by means of contact printing utilizing a pair of mirror-image magnetic stampers/imprinters. The invention has particular utility in the formation of servo patterns in the surfaces of magnetic recording layers of magnetic and magneto-optical (MO) data/information storage and retrieval media, e.g., hard disks.

BACKGROUND OF THE INVENTION

Magnetic and magneto-optical (MO) recording media are widely used in various applications, e.g., in hard disk form, particularly in the computer industry, for storage and retrieval of large amounts of data/information. Typically such media require pattern formation in the major surface(s) thereof for facilitating operation, e.g., servo pattern formation for enabling positioning of the read/write transducer head over a particular data band or region.

Magnetic and magneto-optical (MO) recording media are conventionally fabricated in thin film form; the former are generally classified as "longitudinal" or "perpendicular", depending upon the orientation (i.e., parallel or perpendicular) of the magnetic domains of the grains of the magnetic material constituting the active magnetic recording layer, relative to the surface of the layer.

In operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

A typical contact start/stop (CSS) method employed during use of disk-shaped recording media, such as the above-described thin-film magnetic recording media, involves a floating transducer head gliding at a predetermined distance from the surface of the disk due to dynamic pressure effects caused by air flow generated between mutually sliding surfaces of the transducer head and the disk. During reading and recording (writing) operations, the transducer head is maintained at a controlled distance from the recording surface, supported on a bearing of air as the disk rotates, such that the transducer head is freely movable in both the circumferential and radial directions, thereby allowing data to be recorded and retrieved from the disk at a desired position in a data zone.

Adverting to FIG. 1, shown therein, in simplified, schematic plan view, is a magnetic recording disk 30 (of either longitudinal or perpendicular type) having a data zone 34 including a plurality of servo tracks, and a contact start/stop (CSS) zone 32. A servo pattern 40 is formed within the data zone 34, and includes a number of data track zones 38 separated by servo tracking zones 36. The data storage function of disk 30 is confined to the data track zones 38, while servo tracking zones 36 provide information to the disk drive which allows a read/write head to maintain alignment on the individual, tightly-spaced data tracks.

Although only a relatively few of the servo tracking zones are shown in FIG. 1 for illustrative simplicity, it should be recognized that the track patterns of the media contemplated herein may include several hundreds of servo zones to improve head tracking during each rotation of the disk. In addition, the servo tracking zones need not be straight radial zones as shown in the figure, but may instead comprise arcs, intermittent zones, or irregularly-shaped zones separating individual data tracks.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. If the actuator arm is held stationary, the magnetic head assembly will pass over a circular path on the disk, i.e., over a data track, and information can be read from or written to that track. Each concentric track has a unique radius, and reading and writing information from or to a specific track requires the magnetic head to be located above that track. By moving the actuator arm, the magnetic head assembly is moved radially on the disk surface between tracks. Many actuator arms are rotatable, wherein the magnetic head assembly is moved between tracks by activating a servomotor which pivots the actuator arm about an axis of rotation. Alternatively, a linear actuator may be used to move a magnetic head assembly radially inwardly or outwardly along a straight line.

As has been stated above, to record information on the disk, the transducer creates and applies a highly concentrated magnetic field in close proximity to the magnetic recording medium. During writing, the strength of the concentrated magnetic field directly under the write transducer is greater than the coercivity of the recording medium, and grains of the recording medium at that location are magnetized in a direction which matches the direction of the applied magnetic field. The grains of the recording medium retain their magnetization after the magnetic field is removed. As the disk rotates, the direction of the writing magnetic field is alternated, based on bits of the information being stored, thereby recording a magnetic pattern on the track directly under the write transducer.

On each track, eight "bits" typically form one "byte" and bytes of data are grouped as sectors. Reading or writing a sector requires knowledge of the physical location of the data in the data zone so that the servo-controller of the disk drive can accurately position the read/write head in the correct location at the correct time. Most disk drives use disks with embedded "servo patterns" of magnetically readable information. The servo patterns are read by the magnetic head assembly to inform the disk drive of track location. In conventional disk drives, tracks typically include both data sectors and servo patterns and each servo pattern typically includes radial indexing information, as well as a "servo burst". A servo burst is a centering pattern to precisely position the head over the center of the track. Because of the locational precision needed, writing of servo patterns requires expensive servo-pattern writing equipment and is a time consuming process.

Co-pending, commonly assigned U.S. patent application Ser. No. 10/082,178, filed Feb. 26, 2002, the entire disclosure of which is incorporated herein by reference, discloses a method and apparatus for reliably, rapidly, and cost-effectively forming very sharply defined magnetic transition patterns in a magnetic medium containing a longitudinal or perpendicular type magnetic recording layer without requiring expensive, complicated servo writing equipment/techniques incurring long processing intervals.

Specifically, the invention disclosed in U.S. patent application Ser. No. 10/082,178 is based upon recognition that a stamper/imprinter comprised of a magnetic material having a high saturation magnetization, $B_{sat}$, i.e., $B_{sat} \geq$ about 0.5 Tesla, and a high permeability, $\mu$, i.e., $\mu \geq$ about 5, e.g., selected from Ni, NiFe, CoNiFe, CoSiFe, CoFe, and CoFeV, can be effectively utilized as a contact "stamper/imprinter" for contact "imprinting" of a magnetic transition pattern, e.g., a servo pattern, in the surface of a magnetic recording layer of a magnetic medium ("workpiece"), whether of longitudinal or perpendicular type. A key feature of this invention is the use of a stamper/imprinter having an imprinting surface including a topographical pattern, i.e., comprised of projections and depressions corresponding to a desired magnetic transition pattern, e.g., a servo pattern, to be formed in the magnetic recording layer. An advantage afforded by the invention is the ability to fabricate the topographically patterned imprinting surface of the stamper/imprinter, as well as the substrate or body therefor, of a single material, as by use of well-known and economical electro-forming techniques.

According to the invention, the magnetic domains of the magnetic recording layer of the workpiece are first unidirectionally aligned (i.e., "erased" or "initialized"), as by application of a first external, unidirectional magnetic field $H_{initial}$ of first direction and high strength greater than the saturation field of the magnetic recording layer, typically $\geq 2{,}000$ and up to about 20,000 Oe. The imprinting surface of the stamper/imprinter is then brought into intimate (i.e., touching) contact with the surface of the magnetic recording layer. With the assistance of a second externally applied magnetic field of second, opposite direction and lower but appropriate strength $H_{re-align}$, determined by $B_{sat}/\mu$ of the stamper material (typically $\geq 100$ Oe, e.g., from about 2,000 to about 4,500 Oe), the alignment of the magnetic domains at the areas of contact between the projections of the imprinting surface of the stamper/imprinter (in the case of perpendicular recording media, as schematically illustrated in FIG. 2) or at the areas facing the depressions of the imprinting surface of the stamper/imprinter (in the case of longitudinal recording media, as schematically illustrated in FIG. 3) and the magnetic recording layer of the workpiece is selectively reversed, while the alignment of the magnetic domains at the non-contacting areas (defined by the depressions in the imprinting surface of the stamper/imprinter) or at the contacting areas, respectively, is unaffected, whereby a sharply defined magnetic transition pattern is created within the magnetic recording layer of the workpiece to be patterned which essentially mimics the topographical pattern of projections and depressions of the imprinting surface. According to the invention, high $B_{sat}$ and high $\mu$ materials are preferred for use as the stamper/imprinter in order to: (1) avoid early magnetic saturation of the stamper/imprinter at the contact points between the projections of the imprinting surface and the magnetic recording layer, and (2) provide an easy path for the magnetic flux lines which enter and/or exit at the side edges of the projections.

Stampers/imprinters for use in a typical application, e.g., servo pattern formation in the recording layer of a disk-shaped, thin film, longitudinal or perpendicular magnetic recording medium comprise an imprinting surface having topographical features consisting of larger area data zones separated by smaller areas with well-defined patterns of projections and depressions corresponding to conventionally configured servo sectors, as for example, disclosed in commonly assigned U.S. Pat. No. 5,991,104, the entire disclosure of which is incorporated herein by reference. For example, a suitable topography for forming the servo sectors may comprise a plurality of projections (alt. depressions) having a height (alt. depth) in the range from about 100 to about 500 nm, a width in the range from about 50 to about 500 nm, and a spacing in the range from about 50 to about 500 nm.

Stampers/imprinters suitable for use in performing the foregoing patterning processes are typically manufactured by a sequence of steps which include providing a "master" comprised of a substantially rigid substrate with a patterned layer of a resist material thereon, the pattern comprising a plurality of projections and depressions corresponding (in positive or negative image form, as necessary) to the desired pattern to be formed in the surface of the stamper/imprinter. Stampers/imprinters are made from the master by initially forming a thin, conformal layer of an electrically conductive, magnetic material (e.g., Ni) over the patterned resist layer and then electro-forming a substantially thicker ("blanket") magnetic layer (of the aforementioned magnetic metals and/or alloys) on the thin layer of electrically conductive material, which electro-formed blanket layer replicates the surface topography of the resist layer. Upon completion of the electro-forming process, the stamper/imprinter is separated from the master, which is then re-used for making additional stampers/imprinters.

Currently, contact printing for servo patterning of magnetic media is performed on one surface of a disk at-a-time, which practice requires steps for placing and properly aligning a magnetic stamper/imprinter disk in contact with a surface of the magnetic medium, e.g., a hard disk, and applying an external magnetic field for forming a magnetic image of the topographically patterned imprinting surface of the magnetic stamper/imprinter on the one side of the disk. In order to form magnetic patterns on both sides of the disk (dual-sided disks being standard in the hard drive industry), the contact printing process must be performed twice, which requirement disadvantageously imposes severe limitations on product throughput rates. Another disadvantage associated with the one surface at-a-time approach is the difficulty in performing contact printing of magnetic media such that the magnetic transition pattern formed on one media surface is aligned with the magnetic transition pattern formed on the other (opposite) surface, primarily due to the difficulty in precisely aligning the magnetic stampers/imprinter(s) on opposing surfaces of the disk. Obtaining precise alignment is complicated and difficult because the workpiece disks and magnetic stampers/imprinters have different inner and outer diameters, and the dimensions of the conventional alignment device are limited by the geometry of the external magnet. As a consequence of the foregoing, the inability to perform accurate, precisely aligned, dual-sided contact printing causes the magnetic contact printing process to be significantly more expensive than warranted for large-scale production. Stated differently, the impetus for developing improved methodology for performing dual-side contact printing of magnetic media resides in the requirement for obtaining increased product throughput rates necessary for economic competitiveness of servo-patterned disk manufacture.

Accordingly, there exists a need for means and methodology for performing dual-sided servo patterning by contact printing which are free of the above-described drawbacks and disadvantages associated with the use of conventional single-sided patterning, which means and methodology facilitate high quality, high throughput replication of precisely aligned servo patterns in dual-sided magnetic and MO disk recording media via contact printing.

The present invention addresses and solves the above-described problems, disadvantages, and drawbacks associated with prior means and methodologies for servo pattern formation in dual-sided thin film magnetic recording media, while maintaining full compatibility with the requirements of automated hard disk manufacturing technology.

DISCLOSURE OF THE INVENTION

An advantage of the present invention is an improved device for use in performing simultaneous contact printing of magnetic patterns in opposing surfaces of a dual-sided recording medium.

Another advantage of the present invention is an improved device for use in performing simultaneous contact printing of servo patterns in opposing surfaces of a dual-sided magnetic or magneto-optical (MO) recording medium.

Yet another advantage of the present invention is an improved method for performing simultaneous contact printing of magnetic patterns in opposing surfaces of a dual-sided recording medium.

Still another advantage of the present invention is an improved method for in performing simultaneous contact printing of servo patterns in opposing surfaces of a dual-sided magnetic or magneto-optical (MO) recording medium.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a device for use in performing simultaneous contact printing of magnetic patterns in opposing surfaces of a dual-sided magnetic or magneto-optical (MO) recording medium, comprising:

(a) a fixedly mounted first magnetic pole having a first end surface;

(b) an axially movable second magnetic pole in axial alignment with the first magnetic pole, the second magnetic pole having a second end surface opposite the first end surface of the first magnetic pole;

(c) a first portion of a centering insert fixture mounted on the first end surface of the first magnetic pole; and (d) a second portion of the centering insert fixture mounted on the second end surface of the second magnetic pole.

According to preferred embodiments of the present invention, the first portion of the centering insert fixture comprises a first means for mounting a first magnetic stamper/imprinter thereon in axial alignment with a second magnetic stamper/imprinter mounted on the second portion of the centering insert fixture; the second portion of the centering insert fixture comprises a second means for mounting a second magnetic stamper/imprinter thereon in axial alignment with the first magnetic stamper/imprinter; and the second means for mounting further comprises means for mounting thereon a dual-sided magnetic or magneto-optical (MO) recording medium with a first surface thereof facing and in axial alignment with an imprinting surface of the first magnetic stamper/imprinter and a second surface thereof facing and in axial alignment with an imprinting surface of the second magnetic stamper/imprinter.

Preferred embodiments of the present invention include those wherein each of the first and second stamper/imprinters and the dual-sided magnetic or MO recording medium are annular-disk-shaped, and the second means for mounting comprises a cylindrical spindle adapted for extending through a centrally located, circularly-shaped opening of each of the first and second stamper/imprinters and the dual-sided magnetic or MO recording medium; and wherein the device further comprises:

(e) a first platen made of a non-magnetic material, the first magnetic pole extending through an opening in a central portion of the first platen; and (f) a second platen made of a non-magnetic material, the second magnetic pole extending through an opening in a central portion of the second platen, wherein the first magnetic pole is fixedly attached to the first platen; and the second magnetic pole is axially movable within the opening in the central portion of the second platen.

According to an embodiment of the present invention, the central portion of the first platen comprises a protuberance, the first portion of the centering insert fixture extending beyond the protuberance; and the central portion of the second platen comprises a recess for accommodating therein the protuberance and the first and second portions of the centering insert fixture.

Embodiments of the present invention include those wherein the protuberance and the recess each include a tapered surface contour for facilitating accommodation of the protuberance within the recess for providing axial alignment of the first and second stampers/imprinters with respective first and second surfaces of the dual-sided magnetic or MO recording medium; the first platen is movable in a transverse direction for facilitating accommodation of the protuberance within the recess; and the second platen includes a linear bearing within the opening in the central portion thereof for facilitating axial movement of the second magnetic pole.

According to another embodiment of the present invention, the first platen comprises a first end face, the second platen comprises a second end face, the first end face being spaced from and facing the second end face; wherein the first end face is provided with at least a pair of axially extending alignment rods; and the second end face is provided with at least a pair of corresponding recesses in axial alignment with the alignment rods for receiving and mating with the alignment rods to provide reliable axial registration/alignment of a first stamper/imprinter and a second stamper/imprinter with respective first and second surfaces of a dual-sided magnetic or MO recording medium.

Preferred embodiments of the present invention include those wherein each of the alignment rods comprises an end having a tapered contour, each of the recesses comprises a sidewall with a tapered contour for receiving and reliably mating with the alignment rods; the first platen is movable in a transverse direction for facilitating accommodation of the alignment rods within the recesses; and the second platen includes a linear bearing within the opening in the central portion thereof for facilitating axial movement of the second magnetic pole.

Another aspect of the present invention is a method of performing simultaneous contact printing of magnetic patterns in opposing surfaces of a dual-sided magnetic or magneto-optical (MO) recording medium, comprising steps of:

(a) providing a device including:
  (i) a fixedly mounted first magnetic pole having a first end surface;
  (ii) an axially movable second magnetic pole in axial alignment with the first magnetic pole, the second magnetic pole having a second end surface opposite to and facing the first end surface of the first magnetic pole;
  (iii) a first portion of a centering insert fixture mounted on the first end surface of the upper magnetic pole;
  (iv) a second, lower portion of the centering insert fixture mounted on the second end surface of the second magnetic pole; and
  (v) means for providing reliable axial alignment/registration of the first and second portions of the centering insert fixture;
(b) mounting a first magnetic stamper/imprinter on the first portion of the centering insert fixture;
(c) mounting a second magnetic stamper/imprinter on the second portion of the centering insert fixture;
(d) mounting a dual-sided magnetic or MO recording medium having opposing first and second surfaces and unidirectionally aligned magnetic domains on the second portion of the centering insert fixture, such that the second surface of the recording medium is in contact and aligned with an imprinting surface of the second magnetic stamper/imprinter;
(e) moving the second magnetic pole axially such that the first surface of the recording medium is in contact and aligned with an imprinting surface of the first stamper/imprinter; and
(f) generating a unidirectional magnetic field between the first and second magnetic poles to simultaneously reverse the direction of alignment of selected ones of the magnetic domains to form magnetic transition patterns in the first and second surfaces of the recording medium corresponding to topographical patterns formed in respective imprinting surfaces of the first and second magnetic stampers/imprinters.

Embodiments of the present invention further comprise steps of:

(g) moving the second magnetic pole axially such that the first surface of the recording medium is spaced apart from the imprinting surface of the first magnetic stamper/imprinter; and
(h) removing the magnetically patterned recording medium from the second portion of the centering insert fixture.

Steps (a)–(h) may be repeated as desired with additional dual-sided recording media and performed in an automated manner.

According to preferred embodiments of the present invention:

step (a)(i) comprises providing the first magnetic pole fixedly mounted to a first platen made of a non-magnetic material, the first magnetic pole extending through an opening in a central portion of the first platen; and step (a)(ii) comprises providing the second magnetic pole as axially movable within a second platen made of a non-magnetic material, the second magnetic pole extending through an opening in a central portion of the second platen;

step (b) comprises mounting an annular disk-shaped magnetic stamper/imprinter on the first portion of the centering insert fixture;

step (c) comprises mounting an annular disk-shaped magnetic stamper/imprinter on the second portion of the centering insert fixture;

step (d) comprises mounting an annular disk-shaped recording medium on the second portion of the centering insert fixture; and step (a)(iv) comprises providing the second portion of the centering insert fixture as including a cylindrical spindle adapted for extending through a centrally located, circularly-shaped opening of each of the first and second magnetic stampers/imprinters and the recording medium.

Preferred embodiments of the present invention include those wherein step (d) comprises mounting an annular disk-shaped magnetic or magneto-optical (MO) recording medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials; steps (b) and (c) each comprise mounting an annular disk-shaped magnetic stamper/imprinter having an imprinting surface comprised of at least one magnetic material having high saturation magnetization $B_{sat} \geq \sim 0.5$ Tesla and high permeability $\mu \geq \sim 5$, selected from the group consisting of Ni, NiFe, CoNiFe, CoSiFe, CoFe, and CoFeV; steps (b) and (c) each comprise mounting an annular disk-shaped magnetic stamper/imprinter having a topographically patterned imprinting surface comprising a patterned plurality of spaced-apart recesses with a plurality of non-recessed areas therebetween, the topographical pattern corresponding to a servo pattern to be formed in a surface of the recording medium.

Particular embodiments of the present invention include those wherein step (d) comprises providing a dual-sided perpendicular magnetic recording medium in which the magnetic domains have been unidirectionally aligned in the first direction by applying a first unidirectional magnetic field thereto in a first direction perpendicular to the first and second surfaces of the recording medium; and step (f) comprises selectively re-aligning the direction of alignment of the magnetic domains of those portions of the first and second surfaces of the recording medium which are in contact with the projections of the topographically patterned imprinting surfaces of the first and second magnetic stampers/imprinters by generating the unidirectional DC magnetic field between the first and second magnetic poles in a second, opposite direction perpendicular to the first and second surfaces of the recording medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features and the same reference numerals are utilized throughout to designate similar features, wherein.

DESCRIPTION OF THE INVENTION

The present invention addresses and solves problems attendant upon the use of magnetic stampers/imprinters for performing simultaneous contact patterning of both sides of dual-sided magnetic and magneto-optical (MO) recording media, e.g., servo patterning. Specifically, the present invention addresses problems arising from differences ("incoherency") in pattern registration between upper and lower disk surfaces. In addition, the present invention has as an aim the elimination of the requirement for one surface at-a-time contact patterning according to the conventional art and the development of means and methodology for performing simultaneous contact patterning of both sides of dual-sided media.

Briefly stated, the present invention is based upon the discovery by the inventors that improved means and methodology for performing simultaneous contact printing of magnetic patterns in both surfaces of a dual-sided magnetic or MO recording medium is provided by utilizing mounting devices which afford rapid and accurate alignment/registration of first and second magnetic stampers/imprinters for contact patterning of oppositely facing major surfaces of a recording medium, e.g., a disk-shaped magnetic or MO medium, wherein the mounting device further includes first and second magnet poles for effecting selective reversal of the orientation of magnetic domains of magnetic layers on both sides of the media. According to a key feature or characteristic of the inventive methodology, the mounting device permits rapid loading and unloading of media, thereby facilitating low cost, automated processing for patterning of a large number of media.

Figure 1:
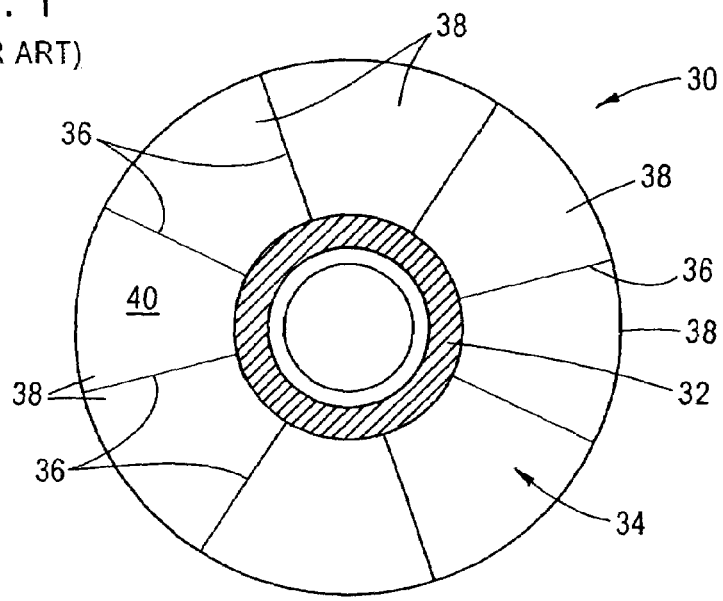
FIG. 1 illustrates in simplified, schematic plan view, a magnetic recording disk designating the data, servo pattern, and CSS zones thereof.
Figure 2:
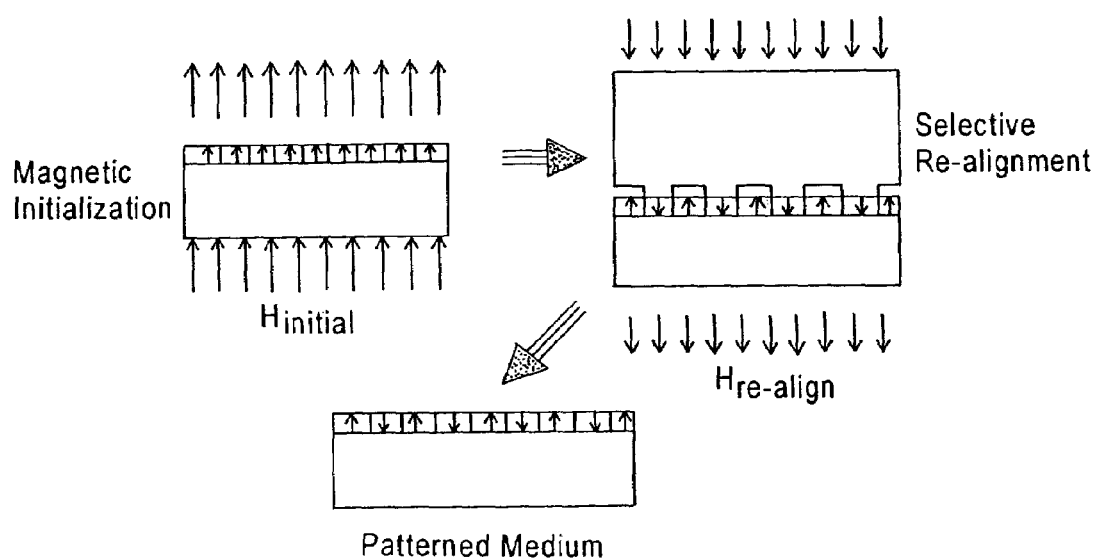
FIG. 2 illustrates, in schematic, simplified cross-sectional view, a sequence of process steps for contact printing a magnetic transition pattern in the surface of a perpendicular magnetic recording layer, utilizing a stamper/imprinter formed of a high saturation magnetization ($B_{sat}$), high permeability ($\mu$) magnetic material having an imprinting surface with a surface topography corresponding to the desired magnetic transition pattern.
Figure 3:
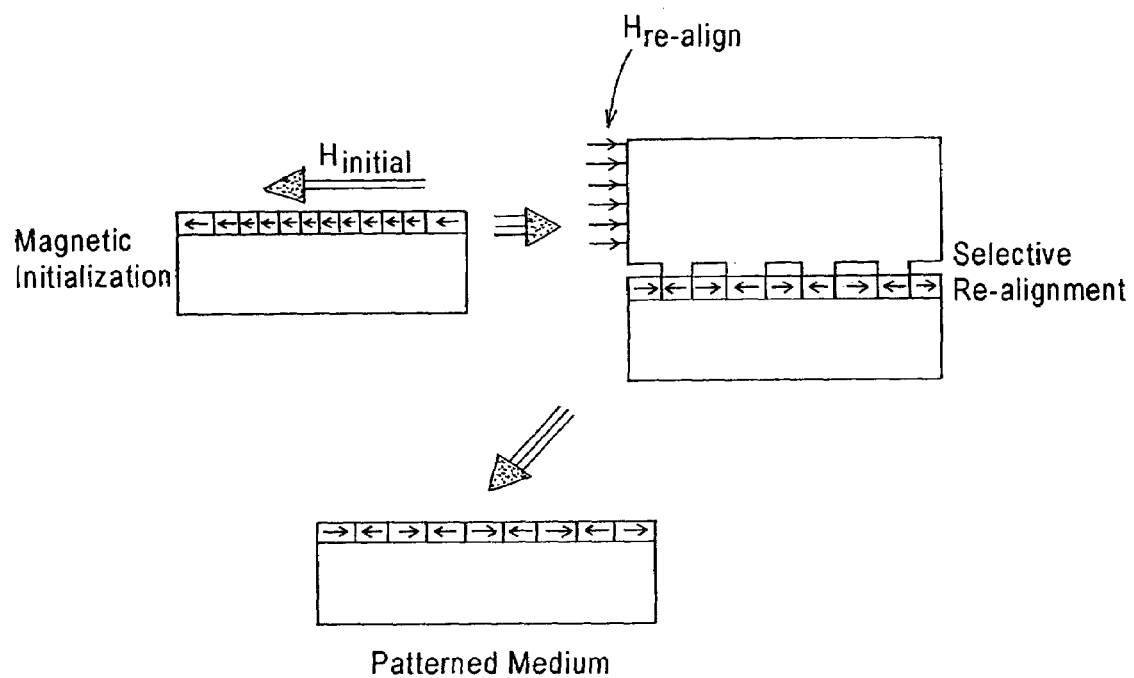
FIG. 3 illustrates, in schematic, simplified cross-sectional view, a similar sequence of process steps for contact printing a magnetic transition pattern in the surface of a longitudinal magnetic recording layer.
Figure 4:
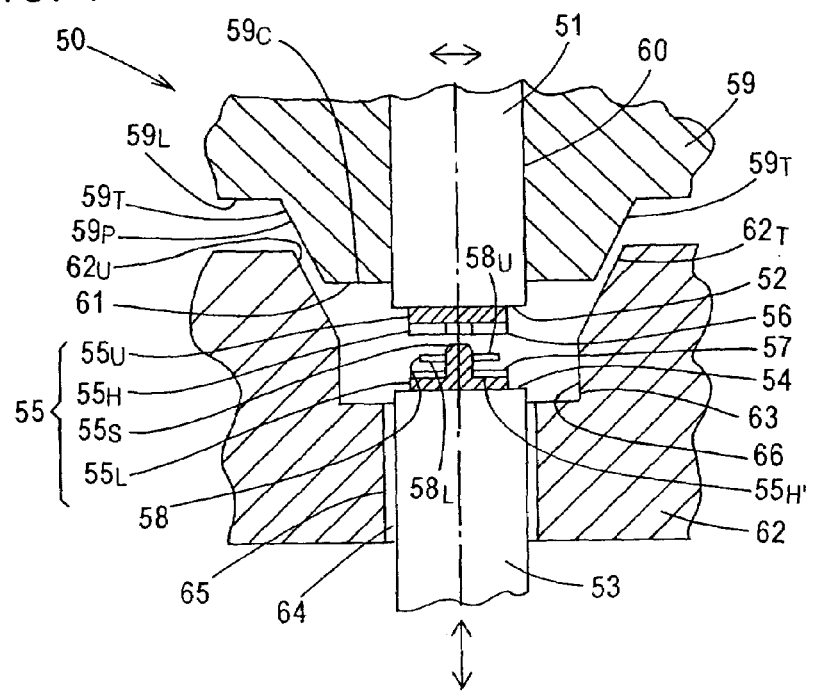
FIG. 4 illustrates, in schematic, simplified cross-sectional view, a device for performing simultaneous contact printing of magnetic patterns in opposing surfaces of a dual-sided magnetic or magneto-optical (MO) recording medium according to an embodiment of the present invention.

Referring to FIG. 4, illustrated therein, in schematic, simplified cross-sectional view, is an embodiment of a device 50 according to the present invention for performing simultaneous contact printing of magnetic patterns in opposing surfaces of dual-sided magnetic or magneto-optical (MO) recording media. It should be noted, however, that while device 50 is shown as in a vertical orientation, operation is possible with other, non-vertical orientations.

As illustrated, device 50 comprises a vertically (i.e., axially) extending, fixedly mounted upper magnetic pole 51 having a first, downwardly facing end surface 52, a vertically (i.e., axially) extending, vertically (i.e., axially) movable lower magnetic pole 53 (as indicated by the double-ended arrow in FIG. 4) in vertical alignment with the upper magnetic pole 51 and having a second, upwardly facing end surface 54 opposite the first, downwardly facing end surface 52 of the upper magnetic pole 51. A first, upper portion $55_U$ of a centering insert fixture 55 having a horizontally extending flat mounting surface $55_H$ for mounting a first, upper magnetic stamper/imprinter 56 is affixed to the first, downwardly facing end surface 52 of the upper magnetic pole 51 and a second, lower portion $55_L$ of the centering insert fixture 55 is affixed to the second, upwardly facing end surface 54 of the lower magnetic pole 53, which second, lower portion $55_L$ of the centering insert fixture 55 includes a horizontally extending flat surface $55_{H'}$ for supporting a second, lower magnetic stamper/imprinter 57 thereon, and an upwardly extending, cylindrical spindle $55_S$ having a suitable diameter adapted for snugly extending through a central opening of annular disk-shaped components of the device, such as the first, upper and second, lower magnetic stampers/imprinters 56, 57 and annular disk-shaped workpieces, such as hard disk recording medium 58.

Device 50 further comprises a first, upper platen 59, made of a non-magnetic material, such as a non-magnetic metal or alloy, the upper magnetic pole 51 being affixed to and extending through a vertically extending opening 60 in a central portion 61 of the first, upper platen 59; and a second, lower platen 62, made of a non-magnetic material, such as a non-magnetic metal or alloy, the lower magnetic pole mounted for axial movement, via linear bearing 64, within and extending through a vertically (i.e., axially) extending opening 65 in a central portion 63 of the second, lower platen 62. The first, upper platen 59 is capable of slight movement in a horizontal (i.e., transverse) direction, as indicated by the double-headed arrow in the figure, for facilitating proper vertical alignment of the respective imprinting surfaces of the first, upper and second, lower magnetic stampers/imprinters 56, 57 with the upper surface $58_U$ and lower surface $58_L$ of recording medium 58.

According to this embodiment of the invention, the mutually facing surfaces $59_L$, $62_U$ of the first, upper and second, lower platens 59, 62 are contoured so as to facilitate reliable vertical alignment of the first, upper and second, lower magnetic stampers/imprinters 56, 57 with the upper and lower surfaces of the recording medium 58. Thus, the central portion 61 of the first, upper platen 59 comprises a protuberance $59_P$ extending from the lower surface $59_L$ thereof, with the first, upper portion of the centering insert fixture $55_U$ extending below protuberance $59_P$; and the central portion 63 of the second, lower platen 62 comprises a recess 66 for accommodating protuberance $59_P$ therein and the first, upper and second, lower portions $55_U$ and $55_L$ of the centering insert fixture 55. According to the preferred embodiment of the invention, the protuberance $59_P$ and recess 66 each include a tapered surface contour, $59_T$ and $62_T$ for facilitating accommodation of the protuberance within the recess, whereby the first, upper stamper/imprinter 56 and the second, lower stamper/imprinter 57 are reliably vertically aligned with respective first, upper surface $58_U$ and second, lower surface $58_L$ of dual-sided recording medium 58.

According to an alternate embodiment of the invention, the first, upper portion $55_U$ of centering insert fixture 55 is mounted on the central portion 61 of the first, upper platen 59 rather than on the end surface 52 of the upper magnetic pole 51, in which instance the first, upper portion $55_U$ of centering insert fixture 55 will be vertically aligned and locked in position during the alignment process. Subsequent operation is the same as described below.

In use of device 50, a first, upper magnetic stamper/imprinter 56 is mounted on the first, upper portion $55_U$ of the centering insert fixture 55; the second, lower magnetic stamper/imprinter 57 is mounted on the second, lower portion $55_L$ of the centering insert fixture 55; a dual-sided magnetic or MO recording medium 58 having respective opposing upper and lower surfaces $58_U$ and $58_L$ and unidirectionally aligned magnetic domains is mounted on the second, lower portion $55_L$ of the centering insert fixture, such that the lower surface $58_L$ of the recording medium 58 is in contact and aligned with an upwardly facing imprinting surface of the second, lower magnetic stamper/imprinter 57; the lower magnetic pole 53 is then moved vertically upwardly (i.e., axially) such that the upper surface $58_U$ of the recording medium 58 is in contact and aligned with a downwardly facing imprinting surface of the first, upper magnetic stamper/imprinter 56; a unidirectional magnetic field having a polarity opposite that of the unidirectionally aligned magnetic domains is then generated (for a suitable interval) between the upper and lower magnetic poles 51, 53, respectively, to simultaneously reverse the direction of alignment of selected ones of the magnetic domains of the magnetic recording layers on both surfaces of medium 58 to simultaneously form magnetic patterns in the upper and lower surfaces thereof corresponding to topographical patterns formed in the respective imprinting surfaces of the upper and lower magnetic stampers/imprinters 56, 57.

Subsequent to the above-described processing for effecting selective re-alignment of the magnetic domains for simultaneously forming magnetic patterns in both surfaces of the dual-sided recording medium by contact printing, the lower magnetic pole 53 is moved vertically downwardly (i.e., axially), such that the upper surface $58_U$ of the magnetically patterned medium 58 is spaced apart from the downwardly facing imprinting surface of the first, upper magnetic stamper/imprinter 56, and the magnetically patterned medium 58 then removed from the second, lower portion $55_L$ of the centering insert fixture 55 for removal from device 50.

The above-described sequence of steps for performing simultaneous contact printing of magnetic patterns in dual-sided recording media may then be repeated with additional recording media. According to a preferred embodiment of the invention, the process is performed in an automated fashion, as by use of robotic loading/unloading means and solenoid actuated vertical movement of the lower magnetic pole.

Figure 5:
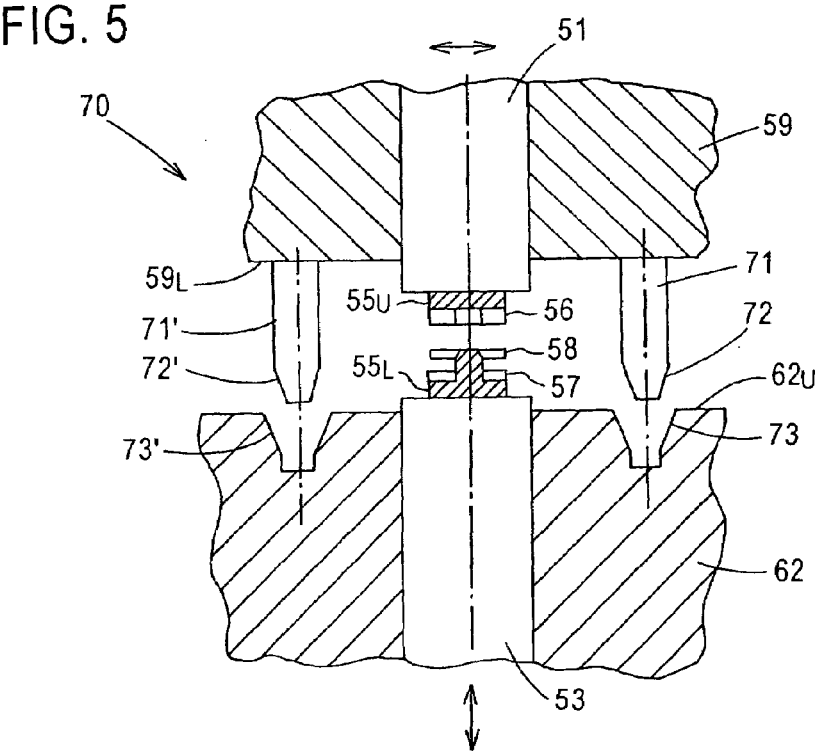
FIG. 5 illustrates, in schematic, simplified cross-sectional view, a device for performing simultaneous contact printing of magnetic patterns in opposing surfaces of a dual-sided magnetic or magneto-optical (MO) recording medium according to another embodiment of the present invention.

Adverting to FIG. 5, illustrated therein, in schematic, simplified cross-sectional view, is a device 70 for performing simultaneous contact printing of magnetic patterns in opposing surfaces of a dual-sided magnetic or magneto-optical (MO) recording medium according to another embodiment of the present invention. As before, it should be noted that while device 70 is shown as being in a vertical orientation, operation of the device in non-vertical orientations is possible.

Device 70 is generally similar to device 50 (and thus will not be described in detail), and differs from the latter essentially in the means for facilitating reliable vertical (i.e., axial) registration/alignment of the first, upper and second, lower platens 59 and 62. According to this embodiment, at least a pair of vertically extending alignment rods 71 and 71' having contoured (i.e., tapered) ends 72 and 72' are provided which depend from the lower surface $59_L$ of upper platen 59, and the upper surface $62_U$ of lower platen 62 is provided with at least a corresponding pair of contoured (i.e., tapered) recesses 73 and 73' in vertical (i.e., axial) alignment with the alignment rods 71 and 71' for accommodating and mating with the contoured (i.e., tapered) ends 72 and 72' of alignment rods 71 and 71'. Operation of device 70 is similar in essential respect to that of device 50 as described supra.

According to preferred embodiments of the invention, dual-sided recording medium 58 comprises an annular disk-shaped magnetic or magneto-optical (MO) recording medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials; and each magnetic stamper/imprinter has an annular disk-shaped imprinting surface comprised of at least one magnetic material having high saturation magnetization $B_{sat} \geq \sim 0.5$ Tesla and high permeability $\mu \geq \sim 5$, selected from the group consisting of Ni, NiFe, CoNiFe, CoSiFe, CoFe, and CoFeV, each topographically patterned imprinting surface comprising a patterned plurality of spaced-apart recesses with a plurality of non-recessed areas therebetween, the topographical pattern corresponding to a servo pattern to be formed in a said surface of said recording medium.

Embodiments of the present invention include those wherein the dual-sided recording medium 58 is a perpendicular magnetic recording medium in which the magnetic domains have been unidirectionally aligned in a first direction by applying a first unidirectional magnetic field thereto in a first direction perpendicular to the upper and lower surfaces of said recording medium; and the process comprises selectively re-aligning the direction of alignment of the magnetic domains of those portions of the upper and lower surfaces of the recording medium which are in contact with the projections of the topographically patterned imprinting surfaces of the first, upper and second, lower magnetic stampers/imprinters by generating a unidirectional DC magnetic field between the upper and lower magnetic poles in a second, opposite direction perpendicular to the upper and lower surfaces of the recording medium.

It should be apparent to one of ordinary skill in the art that the present invention, by virtue of the use of an alignment device comprising upper and lower magnetic stampers/imprinters, upper and lower centering insert fixtures, and upper and lower, self-mating platens facilitates automated simultaneous contact patterning of dual-sided media in automated fashion and with improved pattern registration between media surfaces, and thus provides a significant improvement over the conventional art such as has been described above, particularly with respect to the ease and simplicity of performing simultaneous servo patterning of both surfaces of a variety of dual-sided magnetic and MO recording media. Further, the imprinting surfaces of the stampers/imprinters according to the invention can be formed with a wide variety of topographical patterns, whereby the inventive methodology can be rapidly, easily, and cost-effectively implemented in the automated manufacture of a number of magnetic articles, devices, etc., requiring patterning, of which servo patterning of perpendicular magnetic recording media constitute but one example of the versatility and utility of the invention.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A device for use in performing simultaneous contact printing of magnetic patterns in opposing surfaces of a dual-sided magnetic or magneto-optical (MO) recording medium, comprising:
   (a) a fixedly mounted first magnetic pole having a first end surface;
   (b) an axially movable second magnetic pole in axial alignment with said first magnetic pole, said second magnetic pole having a second end surface opposite to and facing said first end surface of said first magnetic pole;
   (c) a first portion of a centering insert fixture mounted on said first end surface of said first magnetic pole;
   (d) a second portion of a centering insert fixture mounted on and extending outwardly from said second end surface of said second magnetic pole;
   (e) a first platen made of a non-magnetic material, said first magnetic pole extending through an opening in a central portion of said first platen: and
   (f) a second platen made of a non-magnetic material, said second magnetic pole extending through an opening in a central portion of said second platen.

2. The device according to claim 1, wherein:
said first portion of said centering insert fixture comprises a first means for mounting a first magnetic stamper/imprinter thereon in axial alignment with a second magnetic stamper/imprinter mounted on said second portion of said centering insert fixture.

3. The device according to claim 2, wherein:
said second portion of said centering insert fixture comprises a second means for mounting a second magnetic stamper/imprinter thereon in axial alignment with said first magnetic stamper/imprinter.

4. The device according to claim 3, wherein:
said second means for mounting further comprises means for mounting thereon a dual-sided magnetic or magneto-optical (MO) recording medium with a first surface thereof facing and in axial alignment with an imprinting surface of said first magnetic stamper/imprinter and a second surface thereof facing and in axial alignment with an imprinting surface of said second magnetic stamper/imprinter.

5. The device according to claim 4, wherein:
each of said first and second stamper/imprinters and said dual-sided magnetic or MO recording medium are annular-disk-shaped, and said second means for mounting comprises a cylindrical spindle adapted for extending through a centrally located, circularly-shaped opening of each of said first and second stamper/imprinters and said dual-sided magnetic or MO recording medium.

6. The device according to claim 1, wherein:
said first magnetic pole is fixedly attached to said first platen; and
said second magnetic pole is axially movable within said opening in said central portion of said second platen.

7. The device according to claim 1, wherein:
said central portion of said first platen comprises a protuberance, said first portion of said centering insert fixture extending beyond said protuberance; and
said central portion of said second platen comprises a recess for accommodating therein said protuberance and said first and second portions of said centering insert fixture.

8. The device according to claim 7, wherein:
said protuberance and said recess each include a tapered surface contour for facilitating accommodation of said protuberance within said recess for providing reliable axial alignment/registration of a first stamper/imprinter and a second stamper/imprinter with respective first and second surfaces of a said dual-sided magnetic or MO recording medium.

9. The device according to claim 7, wherein:
said first platen is movable in a transverse direction for facilitating accommodation of said protuberance within said recess; and
said second platen includes a linear bearing within said opening in said central portion thereof for facilitating axial movement of said second magnetic pole.

10. The device according to claim 1, wherein:
said first platen comprises a first end face, said second platen comprises a second end face, said first end face spaced from and facing said second end face; wherein:
said first end face is provided with at least a pair of axially extending alignment rods; and
said second end face is provided with at least a pair of corresponding recesses in axial alignment with said alignment rods for receiving and mating with said alignment rods to provide reliable axial registration/alignment of a first stamper/imprinter and a second stamper/imprinter with respective first and second surfaces of a said dual-sided magnetic or MO recording medium.

11. The device according to claim 10, wherein:
each of said alignment rods comprises an end having a tapered contour; and
each of said recesses comprises a sidewall with a tapered contour for receiving and reliably mating with said alignment rods.

12. The device according to claim 10, wherein:
said first platen is movable in a transverse direction for facilitating accommodation of said alignment rods within said recesses; and
said second platen includes a linear bearing within said opening in said central portion thereof for facilitating axial movement of said second magnetic pole.

13. A method of performing simultaneous contact printing of magnetic patterns in opposing surfaces of a dual-sided magnetic or magneto-optical (MO) recording medium, comprising steps of:
- (a) providing a device including:
  - (i) a fixedly mounted first magnetic pole having a first end surface;
  - (ii) an axially movable second magnetic pole in axial alignment with said first magnetic pole, said second magnetic pole having a second end surface opposite to and facing said first end surface of said first magnetic pole;
  - (iii) a first portion of a centering insert fixture mounted on said first facing end surface of said first magnetic pole;
  - (iv) a second portion of said centering insert fixture mounted on said second end surface of said second magnetic pole; and
  - (v) means for providing reliable axial alignment/registration of said first and second portions of said centering insert fixture;
- (b) mounting a first magnetic stamper/imprinter on said first portion of said centering insert fixture;
- (c) mounting a second magnetic stamper/imprinter on said second portion of said centering insert fixture;
- (d) mounting a dual-sided magnetic or MO recording medium having opposing first and second surfaces and unidirectionally aligned magnetic domains on said second portion of said centering insert fixture, such that said second surface of said recording medium is in contact and axially aligned with an imprinting surface of said second magnetic stamper/imprinter;
- (e) moving said second magnetic pole axially such that said first surface of said recording medium is in contact and axially aligned with an imprinting surface of said first magnetic stamper/imprinter; and
- (f) generating a unidirectional magnetic field between said first and second magnetic poles to simultaneously reverse the direction of alignment of selected ones of said magnetic domains to form magnetic patterns in said first and second surfaces of said recording medium corresponding to topographical patterns formed in respective imprinting surfaces of said first and second magnetic stampers/imprinters.

14. The method as in claim 13, further comprising steps of:
- (g) moving said second magnetic pole axially such that said upper surface of said recording medium is spaced apart from said imprinting surface of said first magnetic stamper/imprinter; and
- (h) removing the magnetically patterned recording medium from said second portion of said centering insert fixture.

15. The method as in claim 14, further comprising repeating steps (a)–(h) with additional recording media.

16. The method as in claim 15, comprising performing steps (a)–(h) in an automated manner.

17. The method as in claim 13, wherein:
step (a)(i) comprises providing said first magnetic pole as fixedly mounted to a first platen made of a non-magnetic material, said first magnetic pole extending through an opening in a central portion of said first platen; and
step (a)(ii) comprises providing said second magnetic pole as axially movable within a second platen made of a non-magnetic material, said second magnetic pole extending through an opening in a central portion of said second platen.

18. The method as in claim 13, wherein:
step (b) comprises mounting an annular disk-shaped magnetic stamper/imprinter on said first portion of said centering insert fixture;
step (c) comprises mounting an annular disk-shaped magnetic stamper/imprinter on said second portion of said centering insert fixture;
step (d) comprises mounting an annular disk-shaped recording medium on said second portion of said centering insert fixture; and
step (a)(iv) comprises providing said second portion of said centering insert fixture as including a cylindrical spindle adapted for extending through a centrally located, circularly-shaped opening of each of said first and second magnetic stamper/imprinters and said recording medium.

19. The method as in claim 13, wherein:
step (d) comprises mounting an annular disk-shaped magnetic or magneto-optical (MO) recording medium including at least one layer of a magnetic recording material on each of first and second opposing side surfaces of a substrate comprised of a non-magnetic material selected from the group consisting of Al, NiP-plated Al, Al—Mg alloys, other Al-based alloys, other non-magnetic metals, other non-magnetic metal based alloys, glass, ceramics, polymers, glass-ceramics, and composites or laminates of the aforementioned materials.

20. The method as in claim 13, wherein:
steps (b) and (c) each comprise mounting an annular disk-shaped magnetic stamper/imprinter having an imprinting surface comprised of at least one magnetic material having high saturation magnetization $B_{sat} \geq \sim 0.5$ Tesla and high permeability $\mu \geq \sim 5$, selected from the group consisting of Ni, NiFe, CoNiFe, CoSiFe, CoFe, and CoFeV.

21. The method as in claim 20, wherein:
steps (b) and (c) each comprise mounting an annular disk-shaped magnetic stamper/imprinter having a topographically patterned imprinting surface comprising a patterned plurality of spaced-apart recesses with a plurality of non-recessed areas therebetween, said topographical pattern corresponding to a servo pattern to be formed in a said surface of said recording medium.

22. The method as in claim 21, wherein:
step (d) comprises providing a dual-sided perpendicular magnetic recording medium in which the magnetic domains have been unidirectionally aligned in said first direction by applying a first unidirectional magnetic field thereto in a first direction perpendicular to said first and second surfaces of said recording medium; and
step (f) comprises selectively re-aligning the direction of alignment of the magnetic domains of those portions of said first and second surfaces of said recording medium which are in contact with said projections of said topographically patterned imprinting surfaces of said first and second magnetic stampers/imprinters by generating said unidirectional DC magnetic field between said first and second magnetic poles in a second, opposite direction perpendicular to said first and second surfaces of said recording medium.

23. A device for use in performing simultaneous contact printing of magnetic patterns in opposing surfaces of a dual-sided magnetic or magneto-optical (MO) recording medium, comprising:
   (a) a fixedly mounted first magnetic pole having a first end surface;
   (b) an axially movable second magnetic pole in axial alignment with said first magnetic pole, said second magnetic pole having a second end surface opposite to and facing said first end surface of said first magnetic pole;
   (c) a first portion of a centering insert fixture mounted on said first end surface of said first magnetic pole;
   (d) a second portion of a centering insert fixture mounted on and extending outwardly from said second end surface of said second magnetic pole; and
   (e) a first platen made of a non-magnetic material, said first magnetic pole extending through an opening in a central portion of said first platen.

* * * * *